(12) United States Patent
Xiao et al.

(10) Patent No.: US 8,995,739 B2
(45) Date of Patent: Mar. 31, 2015

(54) ULTRASOUND IMAGE OBJECT BOUNDARY LOCALIZATION BY INTENSITY HISTOGRAM CLASSIFICATION USING RELATIONSHIPS AMONG BOUNDARIES

(71) Applicant: Seiko Epson Corporation, Tokyo (JP)

(72) Inventors: Jing Xiao, Cupertino, CA (US); Chenyu Wu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 13/971,905

(22) Filed: Aug. 21, 2013

(65) Prior Publication Data

US 2015/0055840 A1    Feb. 26, 2015

(51) Int. Cl.
*G06K 9/00* (2006.01)
*G06T 7/00* (2006.01)
*G06K 9/46* (2006.01)
*G06K 9/62* (2006.01)

(52) U.S. Cl.
CPC ............. *G06T 7/0012* (2013.01); *G06T 7/0085* (2013.01); *G06K 9/4647* (2013.01); *G06K 9/6267* (2013.01)
USPC .......................................... 382/131; 600/443

(58) Field of Classification Search
CPC ............................ G06T 7/0085; G06K 9/4647
USPC .................. 382/131, 128; 600/443, 447, 449
See application file for complete search history.

(56) References Cited

U.S. PATENT DOCUMENTS

| | | | |
|---|---|---|---|
| 5,520,183 A | 5/1996 | Lake et al. | |
| 7,004,904 B2 | 2/2006 | Chalana et al. | |
| 7,499,578 B2* | 3/2009 | Reeves et al. | 382/131 |
| 7,727,153 B2* | 6/2010 | Fritz et al. | 600/449 |
| 7,736,313 B2* | 6/2010 | Luo et al. | 600/437 |
| 2007/0038084 A1* | 2/2007 | Burla et al. | 600/437 |
| 2007/0167779 A1 | 7/2007 | Kim et al. | |
| 2009/0274340 A1 | 11/2009 | Wilson et al. | |
| 2011/0004101 A1* | 1/2011 | Yang et al. | 600/443 |
| 2012/0226152 A1 | 9/2012 | Porikli | |

FOREIGN PATENT DOCUMENTS

EP    1531730    5/2005

OTHER PUBLICATIONS

Automatic Classification of Muscle Condition based on Ultrasound Image Morphological Differences, Wan M. Hafizah, Joanne Z. E. Soh, Eko Supriyanto and Syed M. Nooh, International Journal of Biology and Biomedical Engineering, Issue 1, vol. 6, 2012 (pp. 87-96).

(Continued)

*Primary Examiner* — Gregory M Desire

(57) ABSTRACT

Fatty tissue boundary depths and muscle tissue boundary depths are identified in an ultrasound image by first creating an average intensity histogram of the ultrasound image. The histogram has a plurality of peaks, but has the characteristic that one of its peaks corresponds to a fat boundary depth, and a second of its peaks corresponds to a muscle boundary depth. A first classifier based solely on the local-characteristics of individual peaks is used to identify a first fat tissue depth. A second classifier trained to find a muscle depth given a fat depth, receives the output from the first classifier and identifies an output muscle tissue depth relative to the first fat tissue depth. A third classifier trained to find a fat boundary depth given a muscle boundary depth, receives the output muscle tissue depth and outputs a second fat boundary depth.

17 Claims, 13 Drawing Sheets

(56) References Cited

OTHER PUBLICATIONS

A New Technique for Combining Multiple Classifiers using The Dempster-Shafer Theory of Evidence, Ahmed Al-Ani and Mohamed Deriche, Signal Processing Research Centre, Brisbane, Australia, Journal of Artificial Intelligence Research 17, Nov. 2002, (334-361).

Combining Classification with Clustering for Web Person Disambiguation, Jian Xu, Qin Lu, Zhengzhong Liu, Department of Computing, Hong Kong, Apr. 16-20, 2012, Lyon, France, (pp. 637-638).
Rapid Image Stitching and Computer-Aided Detection for Multipass Automated Breast Ultrasound, Ruey-Feng Chang, Kuang-Che Chang-Chien, Etsuo Takada, Chiun-Sheng Huang, Yi-Hong CHou, Chenming Kuo, Jeon-Hor Chen, May 2010, (pp. 1-11).

* cited by examiner

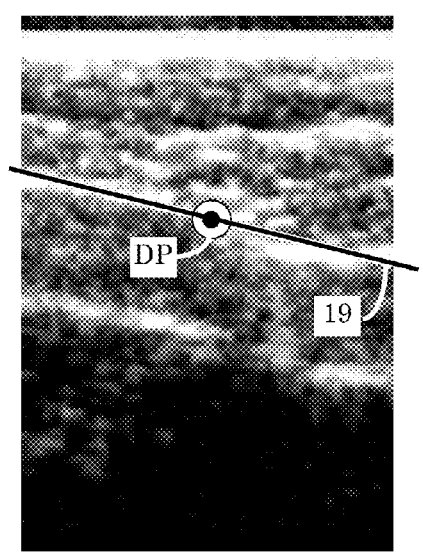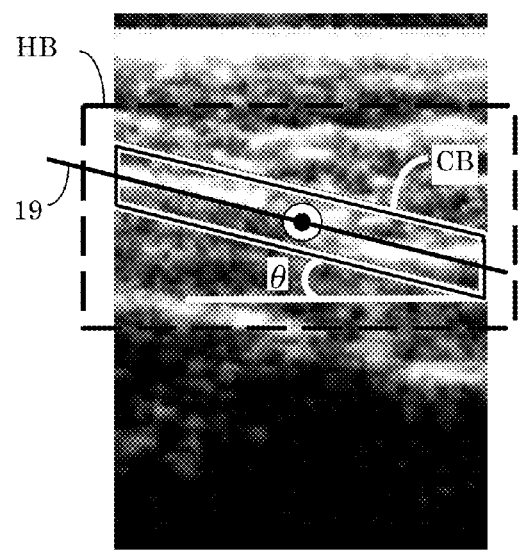
15d　　　　　　　　15e
Fig. 4

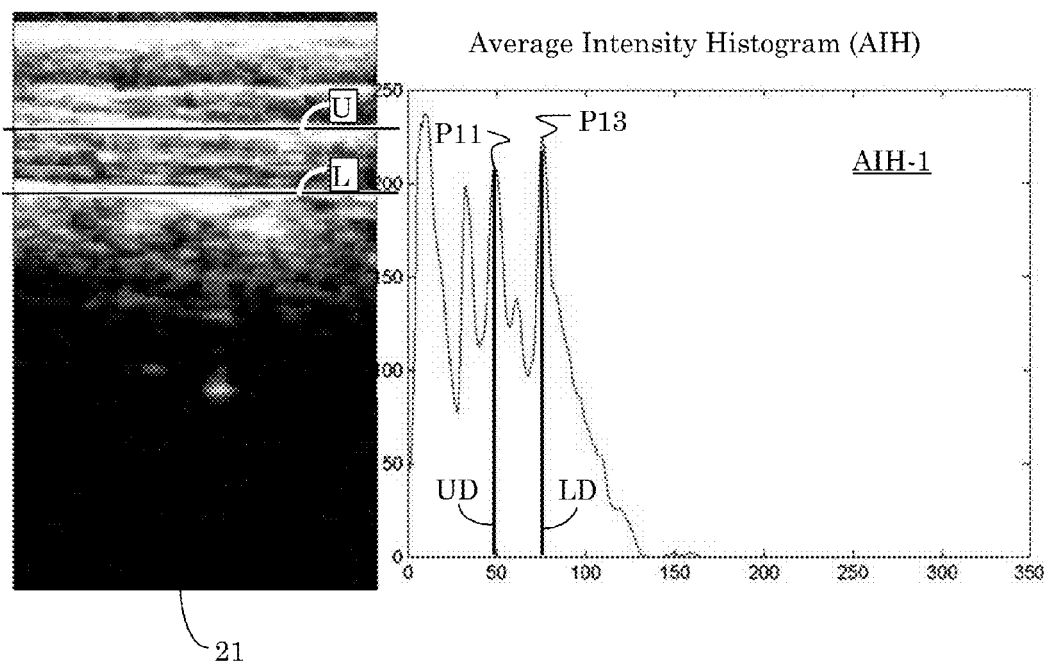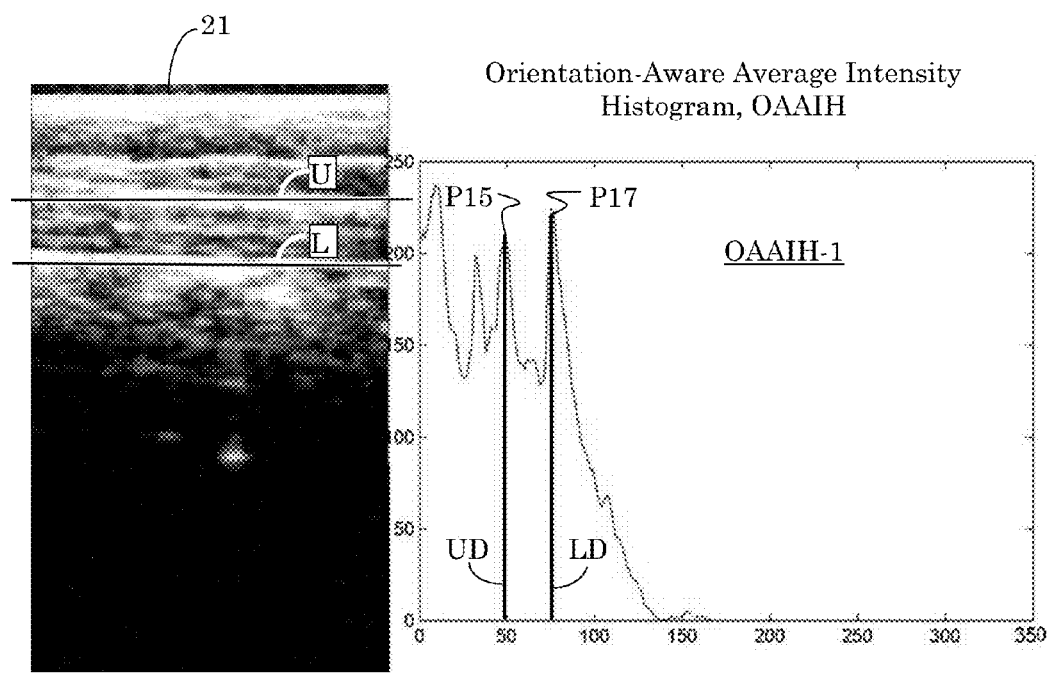
Fig. 5

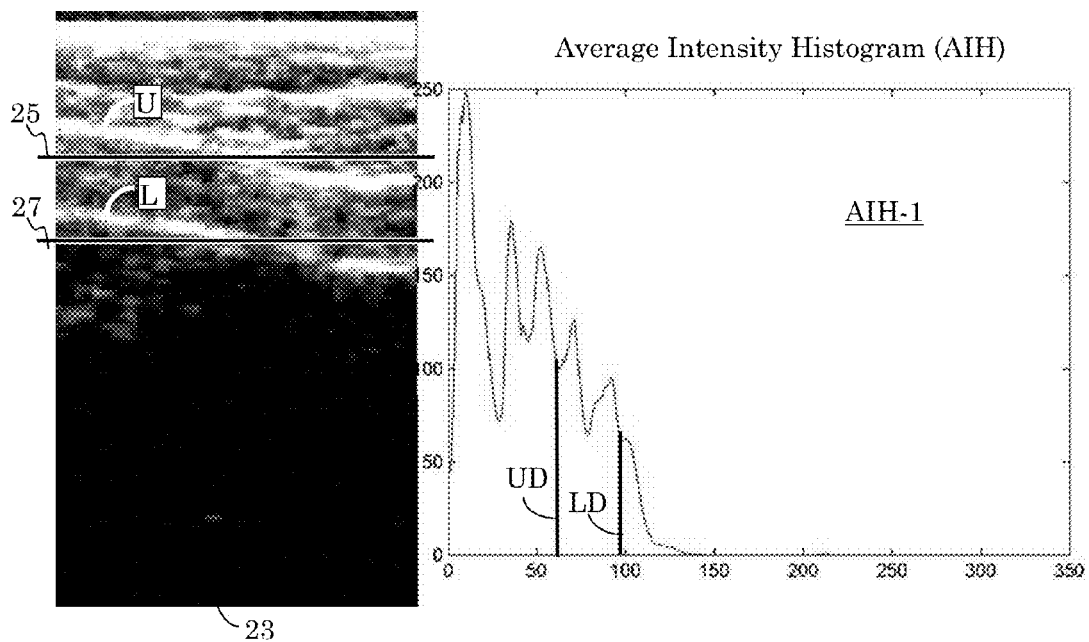
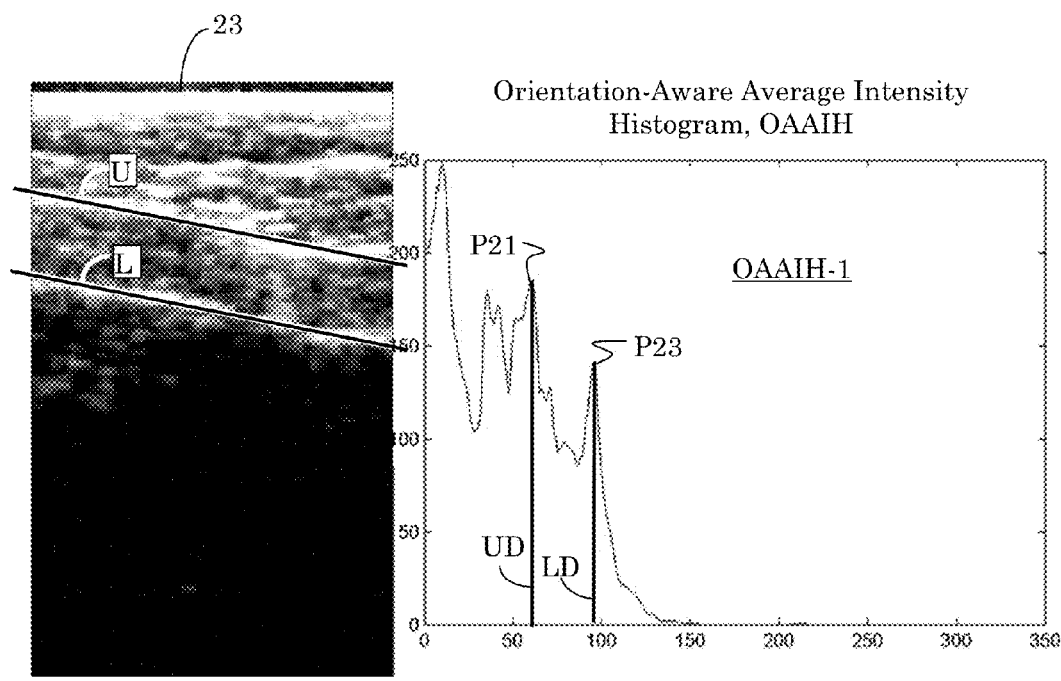
Fig. 6

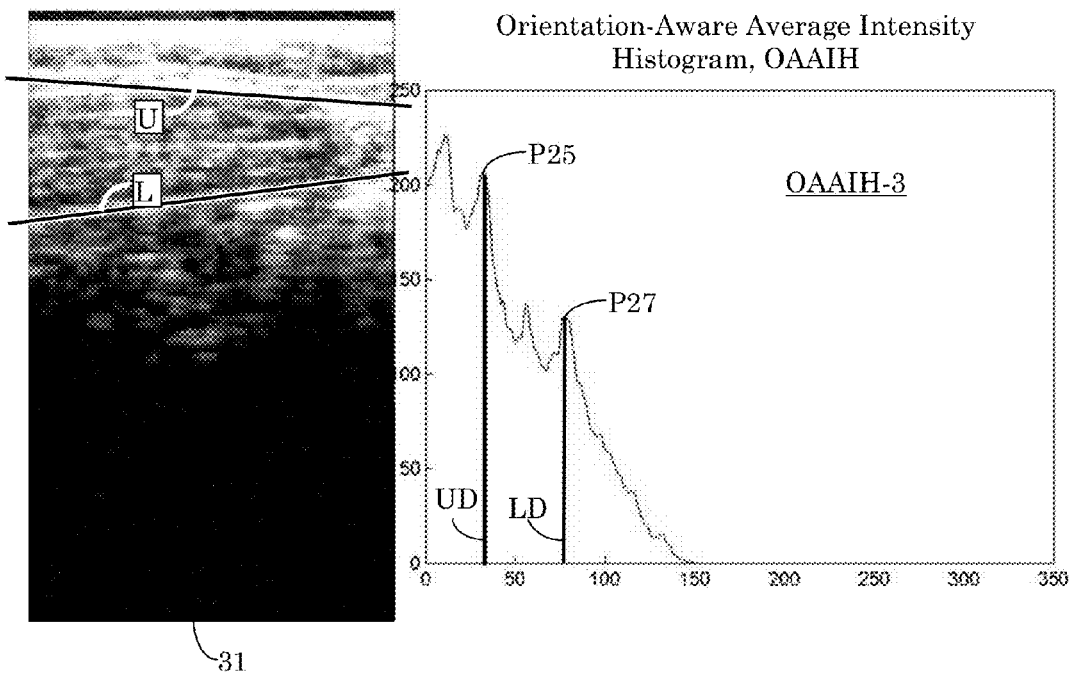
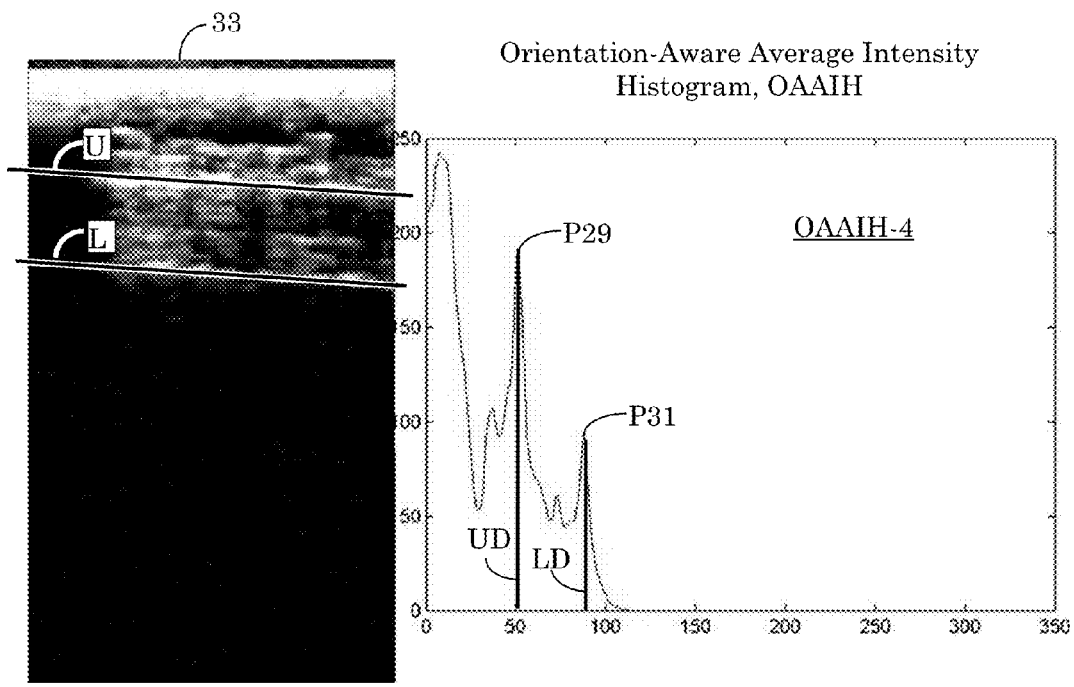
Fig. 7

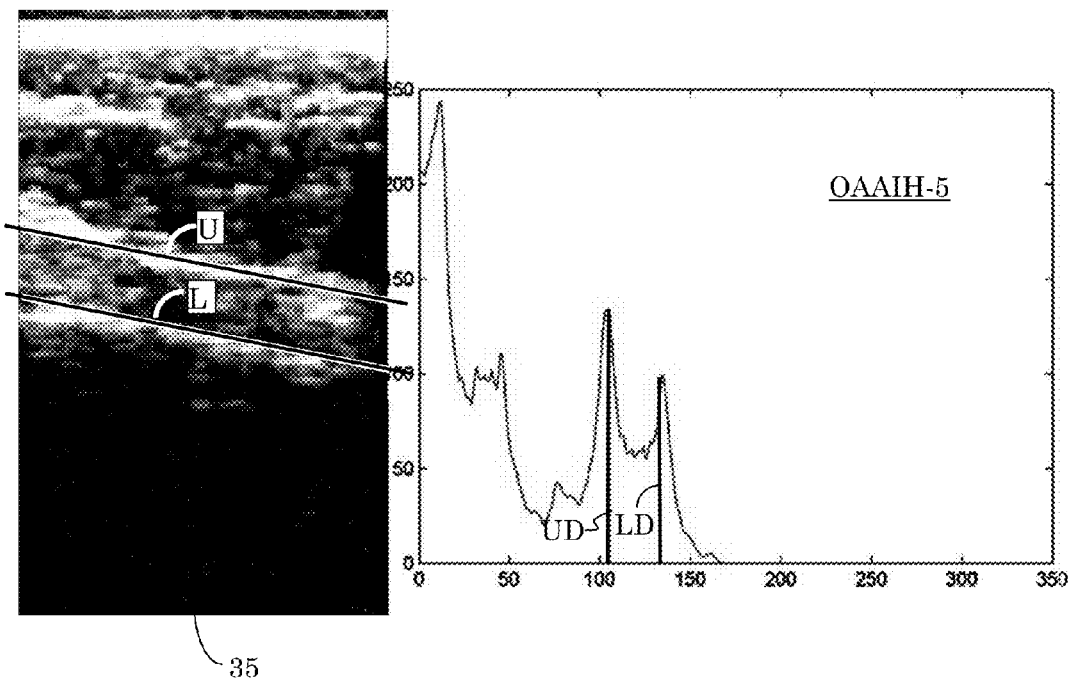
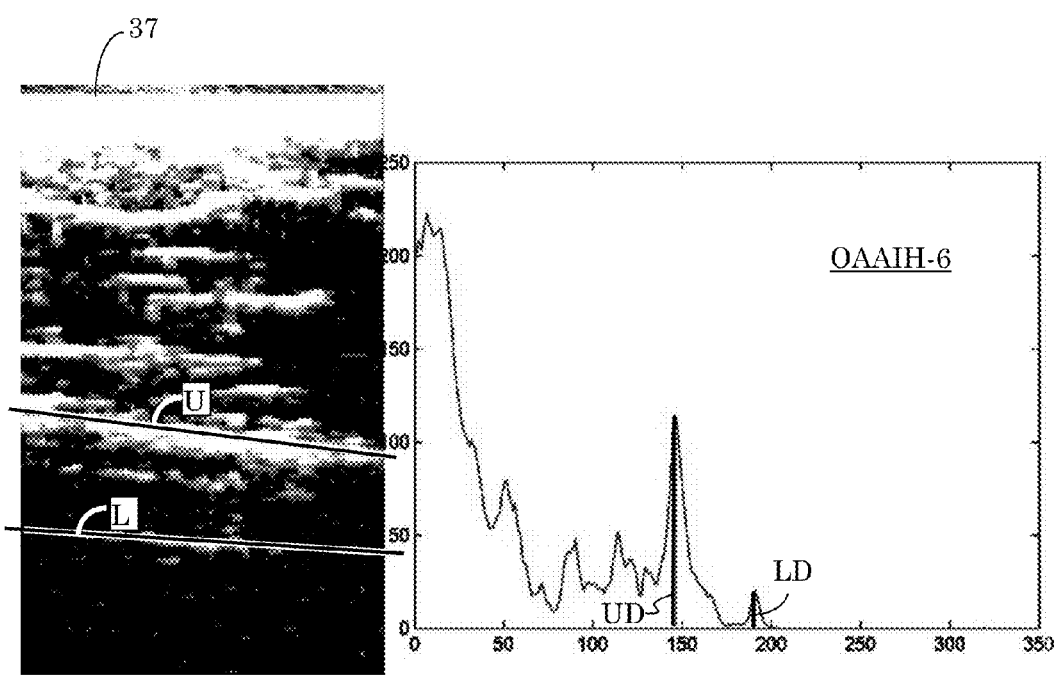
Fig. 8

ULTRASOUND IMAGE OBJECT BOUNDARY LOCALIZATION BY INTENSITY HISTOGRAM CLASSIFICATION USING RELATIONSHIPS AMONG BOUNDARIES

BACKGROUND

1. Field of Invention

The present invention relates to the field of ultrasound imaging. More specifically, it relates to detecting the depths of inter-tissue boundaries within an ultrasound image.

2. Description of Related Art

Ultrasound imaging refers to the imaging of structures below a subject's surface (such as the imaging of internal human organs below a skin surface) by the sending of sound waves of known frequency into the interior of the subject and observing any sound waves that bounce back. By monitoring how long it takes for sound waves to bounce back from an internal structure, it is possible to estimate the depth and shape of the structure within the subject. It is also possible to discern some characteristics about the internal structure based on how the sound waves are absorbed, dispersed or deflected.

Ultrasonography, or diagnostic sonography, refers to the use of ultrasound imaging techniques for imaging subcutaneous body structures, or tissues, for diagnostic purposes. Ultrasound imaging may be used to image various types of tissues, such as muscle, fat, tendons, vessels, internal organs, etc. Another example is obstetric sonography, which is used to image a developing baby during pregnancy.

Ultrasound imaging typically applies a series of ultrasound waves at a frequency above the human audible range, and observed the sound waves that bounce back. Each sound wave is observed separately and constitutes a scan signal, or a scan line of an image. The collection of observed sound waves, or scan lines or scan signals, are placed sequentially next to each other to construct a two-dimensional image in a manner similar to how images are created in a cathode ray tube.

A problem with ultrasound images is that they are typically very noisy, due in part to the great many tissues and fluids of differing densities and types encountered by a sound wave as it propagates and dissipates through its downward and upward paths through an observed body.

Another problem with ultrasound images is that they are constructed by moving an ultrasound wand over the surface of a target tissue area, but the resultant ultrasound image formed from one pass of the ultrasound wand is typically very narrow. This provides a user (i.e., an ultrasound technician) with only a small observable part (or swatch or slice) of the whole of the target tissue area. As a result, multiple swatches are typically needed to gather enough imaging information to span the whole of the target area. That is, a technician must make multiple passes with the ultrasound wand along different paths, store the image information from each pass, and try to put together the image information from the different passes.

The ability to stitch together multiple ultrasound images from multiple passes to create one larger ultra sound image is therefore beneficial. To stitch images together refers to the combining of image information from two or more images as seamlessly as possible/practical.

There are several examples of stitching ultrasound images. One example is found in European patent EP1531730A1 to Chin et al, which describes the stitching of multiple ultrasound images to construct a composite whole to aid in the diagnosis of breast cancer. Another example is provided in "Rapid Image Stitching and Computer-Aided Detection for Multipass Automated Breast Ultrasound", *Med. Phys.* 37 (5), May 2010, by Chang et al., which describes using the sum of absolute block-mean difference (SBMD) measure to stitch ultrasound images.

In general, image stitching requires two more adjacent images having some overlapping portion. Characteristic features of each image (at least within their overlapping portions) are identified and described. The distinctive descriptions of the characteristic features in one image are then compared with those of its adjacent image to identify characteristic features that may correspond to each other (and thus correspond to the same point on an imaged scene). Characteristic features that correspond to each other may be said to be "indexed" or "correlated" to each other. In this manner, an index of corresponding (i.e. matched or correlated) characteristic features in the overlapping portions can be established. This indexing is then used to align and stitch together the two images.

After one has a good ultrasound image (either a singular ultrasound image or a composite of multiple stitched ultrasound images), the next task is to discern medical information from the dark, noisy image. On important piece of information that often needs to be extracted from ultrasound images is to the boundary depth (or boundary line) of different tissue types. Since an ultrasound image typically provides only a small view (or swatch), a full object will likely not be imaged since it would not fit within the swatch. Nonetheless, boundary localization of objects (or of different types of tissues) within an ultrasound image is important since they determination of the boundary depths (i.e. the depth at which a boundary line dividing two different tissue types is found). The boundary depths are useful in the measuring of object, or tissue, layers, such as for fat and/or muscle measurements. Being able to accurately measure fat/muscle layers is important for obesity control, fitness, and other health-related diagnoses.

Identifying these boundary lines, however, is challenging due to ultrasound images being highly noisy. Further complicating matters is that fat and muscle boundaries can be at various depths across different people. The identification of boundary lines is further complicated due to the shapes and image texture of fat and muscle boundaries both being highly variable.

Therefore, determination of boundary lines is typically left to well-trained technicians with much experience in this field. However, it would be helpful if the localization of tissue boundaries within an ultrasound image could be automated to reduce reliance on specialized technicians.

It is therefore an object of the present invention to provide a method to automatically identify tissue boundary lines within an ultrasound image.

It is a second object of the present invention to provide a method to automatically identify multiple boundaries lines of irregular shapes within an ultrasound image.

It a further object of the present invention to be able to identify boundary lines that delineate the boundary between fatty tissues and muscle

SUMMARY OF INVENTION

The above objects are met in a method/mechanism/system for identifying a first tissue boundary and a second tissue boundary in a test ultrasound image, the second tissue being of a different tissue type than the first tissue, the system comprising: an input for receiving the test ultrasound image; a data processing device configured to process the ultrasound image according to the following steps: (i) generate an intensity histogram from pixel intensities of the test ultrasound image, the intensity histogram having peak regions corresponding to regions of intensity peaks in the test ultrasound image, (ii) calculating a series of stand-alone features for each peak region of the intensity histogram, the stand-alone features being determined from local-peak characteristics of each peak region and lacking any relational correlations between the first and second tissue boundaries; a first classifier coupled to receive the stand-alone features, the first classifier being trained to identify the first tissue boundary using only the stand-alone features and omitting any relational information between boundaries of different tissue types, the first classifier outputting a first boundary estimate; a second classifier coupled to receive the stand-alone features and the first boundary estimate, the second classifier being trained to identify the second tissue boundary using the stand-alone features and a first specified location of the first tissue boundary, the second classifier using the first boundary estimate as the first specified location, and outputting a second boundary estimate; a third classifier coupled to receive the stand-alone features and the second boundary estimate, the third classifier being trained to identify the first tissue boundary using the stand-alone features and a second specified location of the second tissue boundary, the third classifier using second boundary estimate as the second specified location, and outputting a third boundary estimate; identifying the third boundary estimate as the first tissue boundary in the test ultrasound image, and identifying the second boundary estimate as the second tissue boundary in the test ultrasound image.

Preferably in step (i), the intensity histogram has more than two of the peaks, is characterized by having a first of the peaks substantially corresponding to the first tissue boundary, and is characterized by having a second of the peaks substantially corresponding to the second tissue depth.

Also, the first tissue boundary is preferably a fat-tissue boundary and the second tissue boundary is a muscle-tissue boundary.

Further preferably, the intensity histogram provides intensity information versus depth information.

Additionally in step (ii), the series of stand-alone features include at least a plurality of local-peak features selected from the following list of features: weighted average intensity at the peak; intensity histogram peak value divided by the maximum intensity histogram value across all depth positions; intensity histogram peak value divided by the sum of the intensity histogram values across all depth positions; intensity histogram peak value divided by the mean of the intensity histogram peaks that are deeper than a current peak; depth position of the intensity histogram peak; distance to the second highest peak divided by the distance between the first and second highest peaks; the absolute value of the distance to the second highest peak divided by the distance between the first and second highest peaks; first and second order gradients at the intensity histogram peak across a number of scales; gradients divided by the maximum intensity histogram value; gradients divided by the sum of the intensity histogram values; and detected slanting angle with maximum weighted average intensity at the peak position.

Preferably the second classifier uses second-tissue relative features defined from characteristics that relate intensity histogram peaks that correspond to second tissue boundaries to the intensity histogram peaks that correspond to first tissue boundaries.

In this case, the second-tissue relative features may include: the distance to a number of the most possible intensity histogram peaks that correspond to first-tissue boundaries; and the difference between a current intensity histogram peak value and the most possible intensity histogram peaks that correspond to first-tissue boundaries.

Additionally, the third classifier uses first-tissue relative features defined from characteristics that relate intensity histogram peaks that correspond to first tissue boundaries to the intensity histogram peaks that correspond to second tissue boundaries.

In this case, the first-tissue relative features include at least a plurality selected from the following first-tissue relative features: (A) distance to the second specified location of the second tissue boundary; (B) distance to the second specified location of the second tissue boundary divided by the distance between the first and second highest intensity histogram peaks; (C) difference between a current intensity histogram peak value and the intensity histogram value at the second specified location of the second tissue boundary; (D) difference between a current intensity histogram peak value and the intensity histogram value at the second specified location of the second tissue boundary divided by the maximum intensity histogram value; (E) difference between the intensity histogram peak value and the intensity histogram value at the second specified location of the second tissue boundary divided by the sum of the intensity histogram values; (F) difference between the intensity histogram peak value and the intensity histogram value at the second specified location of the second tissue boundary divided by the intensity histogram value at the second specified location of the second tissue boundary; (G) the absolute values of features (D), (E), and (F).

Further preferably in the first classifier, the first boundary estimate is a first estimate of the first tissue boundary within the test image, and in the second classifier, the second boundary estimate is a first estimate of the second tissue boundary within the test image, and in the third classifier, the third boundary estimate is a second estimate of the first tissue boundary within the test image.

Preferably the test ultrasound image includes rows and columns of pixels, and in step (i) the intensity histogram is generated by the following steps: (a) dividing the test ultrasound image into discrete, sequential depth positions, each discrete depth position being defined by a fixed number of rows of pixels; (b) defining a plurality of horizontal band regions, each horizontal band region corresponding to a separate one of the discrete depth positions and fully encompassing its corresponding depth position, each horizontal band region spanning a plurality of sequential depth positions; (c) progressing, one discrete depth position at a time, along the input ultrasound image, and at each, current, depth position executing the following steps: (I) defining a plurality of potential boundary lines within the current horizontal band region that corresponds to the current depth position, each of the defined potential boundary lines traversing a common point within the current horizontal band at a different angle relative to the horizontal; (II) defining a candidate band region corresponding to each potential boundary line following the trajectory of its corresponding boundary line and encompassing its corresponding boundary line; (III) determining an intensity value for each potential boundary line based at least in part on the intensity of pixels within its corresponding candidate boundary region; (IV) recording the potential boundary line of highest intensity value as the candidate line for the current depth position; and (d) collecting the intensity values of candidate lines recorded at the different depth positions into an intensity-vs-depth histogram, the intensity-versus-depth histogram being the intensity histogram.

In this case, in step (II), the length of each candidate band is defined by the length of its corresponding potential boundary line to traverse from one side of the current horizontal band to its opposing side, and the width of each candidate band is multiple times the pixel-width of its corresponding potential boundary line, and each potential boundary line bisects its corresponding candidate band region into two equal parts.

Additionally in step (III), the intensity value for each potential boundary line is determined by the mean and variance of the pixel intensities within its corresponding candidate band.

Further additionally in step (III), when calculating the mean intensity of the pixel intensities within its corresponding candidate band, the intensity of each pixel is weighted by its distance to the candidate band's corresponding potential boundary line, where the farther the distance of a pixel to the potential boundary line, the smaller its weight.

In this case, it is also preferred that the weighted mean intensity be again weighted by the cosine of angle $\theta$ of the candidate band relative to the horizontal direction of the horizontal band.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 4 illustrates an improvement over the method of FIG. 3 for determining intensity values at each depth step on an ultrasound image for the construction of an OAAIH.

FIG. 5 compares the results achieved with an Average Intensity Histogram, AIH-1, with those achieved with an Orientation-Aware Average Intensity Histogram, OAAIH-1, when the boundary lines in an ultrasound image are substantially horizontal.

FIG. 6 compares the results achieved with an Average Intensity Histogram, AIH-1, with those achieved with an Orientation-Aware Average Intensity Histogram, OAAIH-1 when the boundary lines in an ultrasound image are not horizontal.

FIG. 7 provides two additional examples of an Orientation-Aware Average Intensity Histogram in accord with the present invention applied to two additional ultrasound image with irregularly shaped boundary lines U and L.

FIG. 8 illustrates two additional examples of Orientation-Aware Average Intensity Histogram in accord with the present invention applied to two additional histogram images.

DESCRIPTION OF THE PREFERRED EMBODIMENTS

Measuring object boundary depths, such as the boundary depth of a fat layer (or fatty tissue layer) and/or the boundary depth of a muscle layer (or muscle tissue layer) using ultrasound images is important for health care, medical diagnosis, obesity control, general fitness, etc. Boundary localization of objects, or of different tissue types, within ultrasound images is important for determination of the boundary depth of tissue layers.

Identifying these boundary depths, however, is challenging due to ultrasound images being highly noisy. Further complicating matters is that fat and muscle boundaries can be at various depths and shapes across different people. The identification of boundary lines is further complicated due to the shapes and image texture of fat and muscle boundaries both being highly variable.

Figure 1:
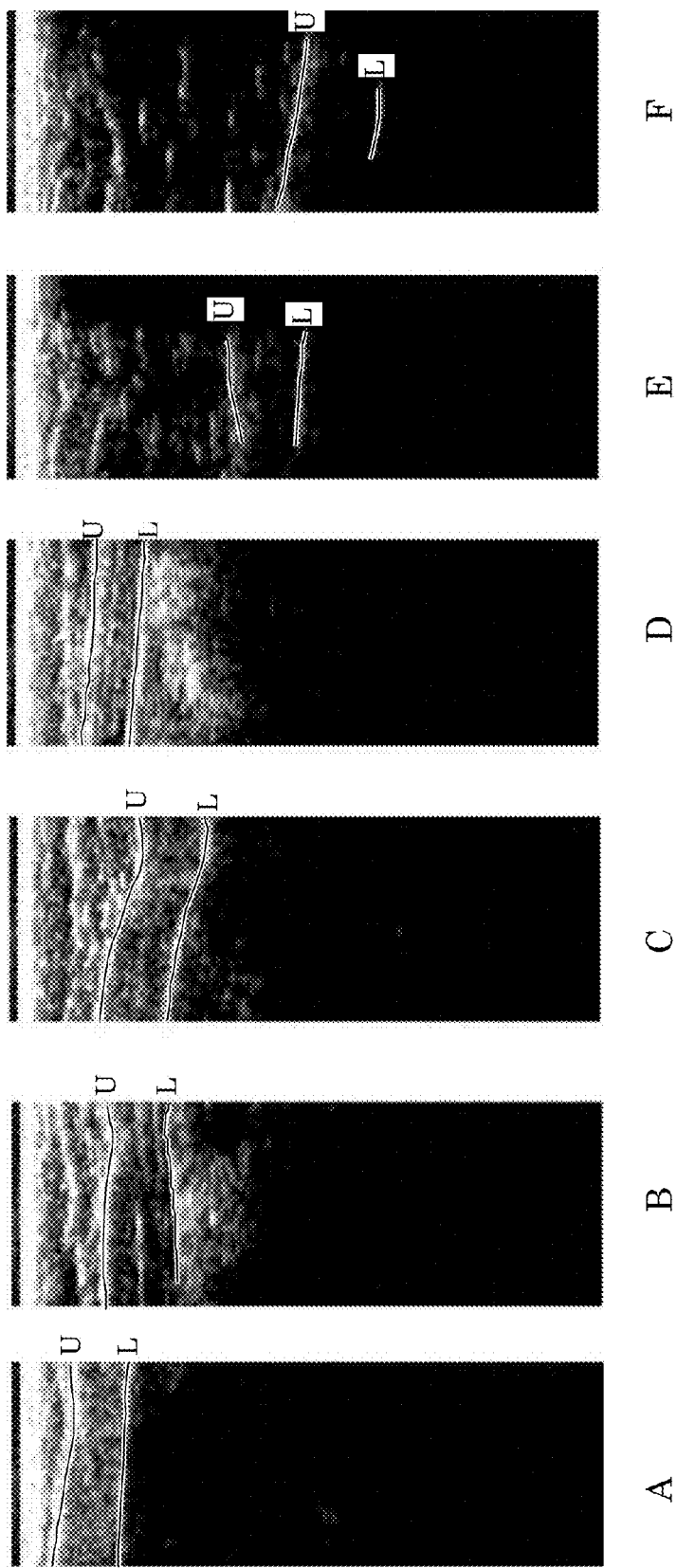
FIG. 1 provides multiple examples A, B, C, D, E, and F of ultrasound images of an abdominal area.

FIG. 1 provides multiple examples A, B, C, D, E, and F of ultrasound images of an abdominal area. Bright pixels typically delineate the boundary regions between tissue types. So to find a boundary, one would look for elongated bright strips within an ultrasound image. An ultrasound image, however, typically has several elongated bright and dark regions so identifying a desired boundary line is not a straight forward issue. Each sample ultrasound image shows two boundary lines at different depths, and in each ultrasound image, the lower boundary line (labeled L in each sample image) is a muscle boundary line, and upper boundary line (labeled U in each sample image) is a fat boundary line. As illustrated, boundary lines may have irregular shapes that slant down across an ultrasound image. As is emphasized by samples E and F, sometimes only a partial boundary line is discernable within an ultrasound image.

Because tissue boundary lines typically show up as bright areas separating two darker areas within an ultrasound image, one method of determining a boundary depth (i.e. the depth at which a boundary line is found) is by means of an Average Intensity Histogram (AIH). An AIH creates a histogram of the average intensity of each horizontal row of pixels as one traverses downward (one-pixel-row at a time) through an ultrasound image.

Figure 2:
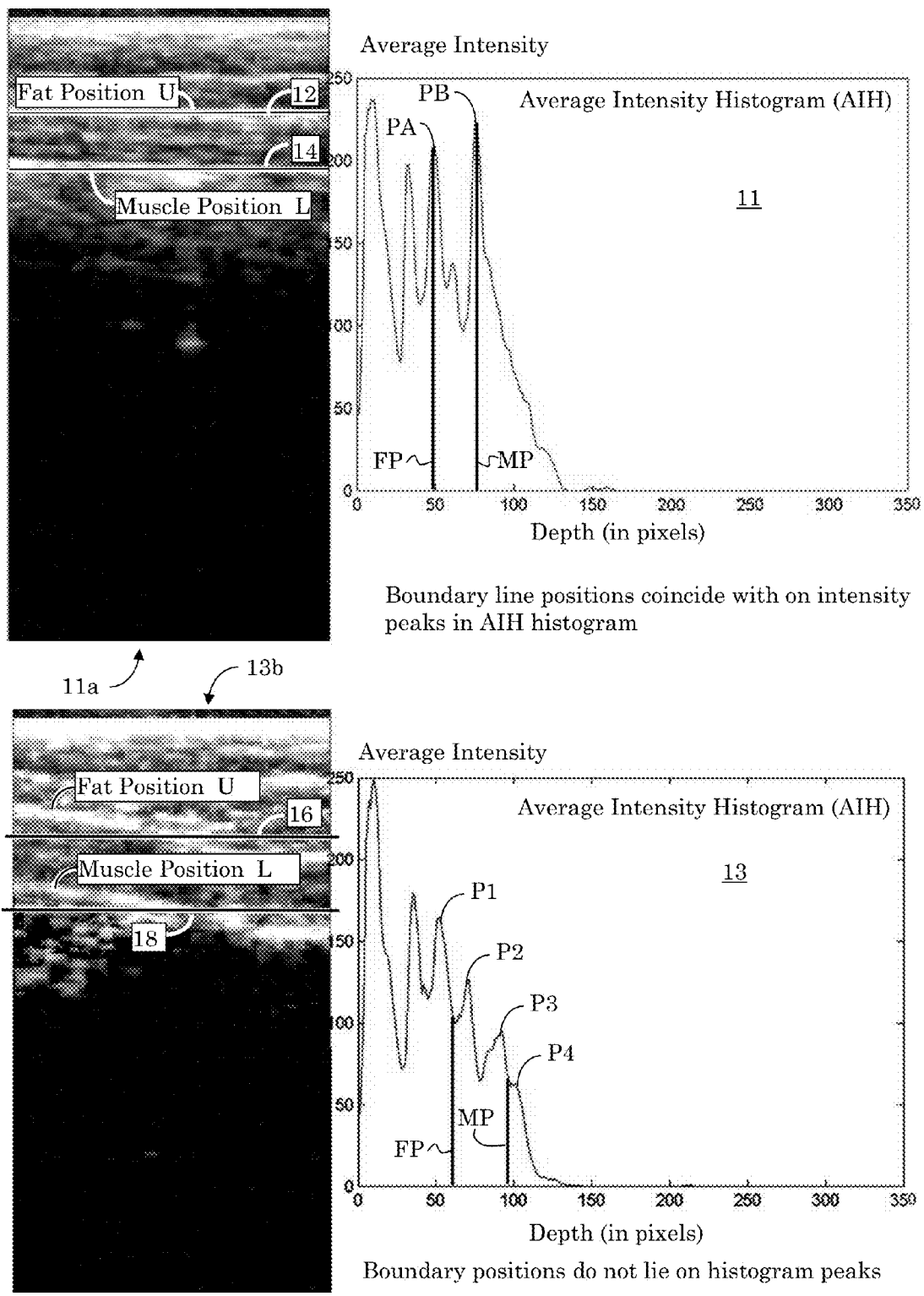
FIG. 2 illustrates two examples of Average Intensity Histograms, AIH, each constructed from a corresponding ultrasound image.

FIG. 2 illustrates two examples of Average Intensity Histograms, 11 and 13, each constructed from a corresponding ultrasound image 11a and 13a. To construct an AIH, at each depth position (i.e. pixel row), the average of the intensity of all pixels in that row is calculated, and this average value represents the histogram value at that given depth. The ordinate (i.e. the vertical axis) of each AIH histogram lists average intensity values, and the abscissa (i.e. the horizontal axis) corresponds to the depth values of the corresponding ultrasound image. Thus, the peaks and valleys of the AIH histogram correspond to bright and dark spots in the average intensity values of rows within the ultrasound image.

In each of histogram 11a and 13a, the upper boundary line U corresponds to the fat depth position, and the lower boundary line L corresponds to the muscle depth position. It is noted that in histogram 11a, boundary lines U and L are mostly horizontal, which corresponds well to taking intensity average of each horizontal row of pixels. That is, horizontal row 12, which is substantially at the same depth position as fat position depth U follows the path of the fat boundary line, and horizontal row 14, which is substantially at the same depth position as muscle position depth L follows the path of the muscle boundary line. As a result, the intensity peaks in AIH 11 correspond well with the depth position of the fat boundary line (labeled FP) in AIH 11 and with the depth position of the muscle boundary line (labledMP). In this case, the peaks of AIH 11 are a good indicator of the depth positions of the fat and muscle boundary lines of ultrasound image 11*a*. But this is not the case in ultrasound image 13*b*.

In ultrasound image 11*b*, boundary lines U and L are curved and slant across the ultrasound image in a diagonal direction relative to the horizontal direction. In this case, the bright pixels of the fat boundary line U and the muscle boundary line L do not match up well with horizontal pixels lines 16 and 18, and thus do not match up well with taking the average intensity of horizontal rows of pixels at each depth position. As a result, neither the fat depth position FP or the muscle depth position MP coincide with an intensity peak in AIH 13. Thus, in this case, the peaks of AIH 13 are not a good indicator of where the boundary depth positions may be found.

Ideally, the depth boundaries should coincide with an intensity peak in the Average Intensity Histogram in order to locate its depth. For example in AIH 11, line FP corresponds to intensity peak PA at depth position 50, and it correctly identifies the fat depth position of the fat boundary line U in ultrasound image 11*a*. Similarly in AIH 11, lines MP corresponds to intensity peak PB at a depth of about 75, and it correctly identifies the muscle depth position of the muscle boundary line L in ultrasound image 11*a*.

Unfortunately, this approach does not work when the boundary lines are not substantially horizontal, as is illustrated by AIH 13. That is, slanted tissue boundaries may not be located on the histogram peaks of an AIH. In the case of AIH 13, fat position boundary line FP is located between intensity peaks P1 and P2, and muscle position boundary line MP is located between intensity peaks P3 and P4. Thus, AIH 13 would not be suitable for determining the positions of FP and MP.

The present invention proposes to redefine the Average Intensity Histogram by considering an expanded list of possible boundary lines along different directions at each depth position. That is, the present invention provides a novel method of defining and characterizing candidate boundary lines in an ultrasound image such that the boundary line consistently, substantially corresponds to a peak in an intensity histogram. Since only the boundary lines that substantially coincide with intensity peaks in the histogram are likely to correspond to a tissue boundary line, this greatly reduces the number of possible boundary lines for consideration.

The novel method of defining candidate boundary lines makes use of what is herein termed an "Orientation-Aware Average Intensity Histogram" (i.e. OAAIH). The method begins by moving down the middle of an ultrasound image one depth position at time, where a depth position may be defined by a row of pixels so that one moves down the ultrasound image one pixel-row at a time). It is to be understood that one may move down along other pixel positions besides the middle, and that multiple positions may be separately considered (as described below) and their results combined (i.e. averaged). But the presently preferred embodiment considers only one position per depth position, and preferably considers the middle of each depth position row (i.e. each pixel row).

In one embodiment of the present invention, at each depth position, the average intensities along different linear directions within a (preferably horizontal) band region (i.e. within a specified number of pixel-rows) are checked, and the linear direction with the highest average intensity for that depth position is recorded. The recorded linear directions of highest intensity for each depth position are collected into the OAAIH histogram.

Figure 3:
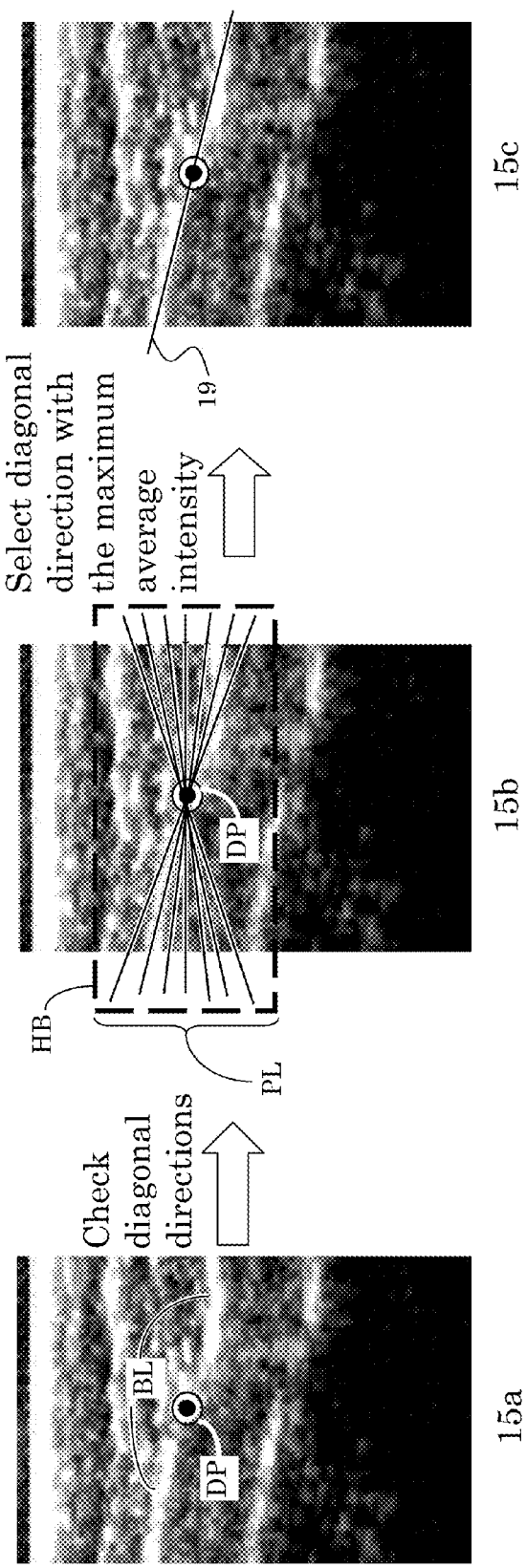
FIG. 3 illustrates how an intensity value at each depth step on an ultrasound image is determinate for the construction of an Orientation-Aware Average Intensity Histogram, OAAIH.

FIG. 3 illustrates how an intensity value for each depth position of an OAAIH is determined in accord with the present embodiment. Ultrasound image 15*a* shows one depth position DP that corresponds to a diagonal and curved boundary line BL. Ultrasound image 15*b* shows multiple potential boundary lines PL, each traversing depth position DP at different direction within a horizontal band HB. One of the potential boundary lines PL is selected as the candidate line (CL) corresponding to depth position DP. The average intensity of pixels along each of the potential boundary line PL is calculated. That is, in the present approach, at each depth position DP, the average intensities along different linear directions PL is checked, and the potential boundary line PL with the maximum average intensity is deemed the candidate line for the current depth position and recorded into the present OAAIH histogram (or an intensity chart). In this manner, the present OAAIH is not limited to only horizontal lines. In the present example, potential boundary line 19 (shown in ultrasound image 15*c*) is selected as the candidate line for depth position DP, since its line path corresponds to the pixels in ultrasound image 15*c* that have the highest average intensity among all the potential boundary lines PL within horizontal region HB.

Using the approach of FIG. 3, wherein one potential boundary line is selected as the candidate line based on the average pixel intensity along that potential boundary line. This approach works better than the above-described method of forming an AIH using only horizontal potential boundary lines. The preferred embodiment, however, expands on the present embodiment to better account for curvatures in the true boundary line of the ultrasound image, and thus improved the present OAAIH.

With reference to FIG. 4, the preferred embodiment defines a candidate band region CB around each potential boundary line 19, such as the potential boundary lines PL within horizontal band HB shown in ultrasound image 15*b* of FIG. 3. The preferred embodiment further calculates an intensity value for each potential boundary line PL based on the intensity distribution of pixels within its respective candidate band CB. For ease of discussion, FIG. 4 illustrates the present process as applied to potential boundary line 19, but it is to be understood that the present processes would be separately applied to each potential boundary line PL within each horizontal band HB that defines each depth step down an ultrasound image.

It is noted that candidate band CB is not necessarily horizontal, but rather follows the orientation of its respective potential boundary line 19. If a potential boundary line 19 is diagonal, its newly defined candidate band CB is also diagonal and follows the orientation of potential boundary line 19. That is, each potential boundary line 19 bisect down the middle of its corresponding candidate band CB, and the intensity value for that potential boundary line is not based sole on the pixels along that potential boundary line, but rather is based on all the pixels within its candidate region CB. For each depth step, potential boundary line PL with the highest intensity value (based on the pixels within its corresponding candidate band CB) is selected as the candidate line for that depth position.

Thus, this alternate OAAIH histogram may thereby include the intensity distribution of the candidate region CB that surrounds each candidate line 19, where pixels within candidate band CB that are closer to its corresponding candidate line 19 (i.e. closer to the center of the recorded linear direction of maximum intensity) are given a higher weight than pixels farther from this linear direction. The average intensity of the linear direction of maximum intensity is also weighted by the cosine of the angle θ relative to a defined horizontal base-line reference (i.e. relative to a pixel row).

As is stated above, although FIG. 4 shows candidate line 19 (i.e. the boundary line with highest average pixel intensity) of ultrasound image 15c of FIG. 3, the present method is applied to each of potential boundary lines PL (see ultrasound image 15b), in turn. A key difference between the approach of FIG. 4 and that of FIG. 3, is that (as is shown in ultrasound image 15e), the present approach defines a candidate band CB around each potential boundary line (with the potential boundary line bisecting its respective candidate band region along its center), and determines an intensity value for that potential boundary line based on the average, variance, and distance to the candidate line of all the pixels within its corresponding candidate band CB, plus the cosine of the angle θ of the candidate band area (i.e. the cosine of the current potential boundary line) with respect to the horizontal axis. That is, a weighted average intensity is calculated for each candidate band region, and highest weighted averaged intensities at the different depth positions are used construct the OAAIH.

This preferred process improves the robustness against noise and an irregular signal strength distribution in an ultrasound image. In this approach, along each linear direction within a horizontal band HB (i.e. along each potential boundary line), one considers not only pixels on the potential boundary line but also considers the pixels within its candidate band CB. The mean and variance of the pixel intensities in the candidate band CB are calculated and the outliers not belonging to this distribution are not considered. Various methods of identifying and rejecting outliers are known in the art, such RANSAC, and the specific method of identifying outliers is not critical to the present invention.

When calculating the average intensity of the remaining pixels within the candidate band CB, the intensity of each pixel is weighted by its distance to the candidate band's center (i.e. to its corresponding potential boundary line), to minimize the bias by occasional small bright spots away from the center. The farther the distance of a pixel to the potential boundary line, the smaller its weight. Preferably, the weight is defined as Weight=$e^{(-distance^2/sigma^2)}$. Finally the weighted average intensity is again weighted by the cosine of its slanting angle θ, relative to the horizontal. The purpose of incorporating the cosine of angle θ into the weight calculation is to somewhat favor the horizontal direction rather than slanted (i.e. diagonal) directions.

In the present invention, the inter-tissue boundary depths within an ultrasound image substantially correspond to peaks in the resultant OAAIH. That is, the candidate lines at depths steps corresponding to peaks in OAAIH are candidates to corresponding for inter-tissue boundaries in the ultrasound image. Thus, one may identify as candidate inter-tissue boundary lines the candidate lines that substantially corresponds to intensity peaks in the OAAIH. For example, the candidate lines that correspond to a peak of the OAAIH may be identified as potential candidate inter-tissue boundary lines. Alternatively, the candidate lines substantially coincide with a peak of the OAAIH (i.e. within plus-or-minus 10 depth positions of a peak of the OAAIH) may be identified as candidate inter-tissue boundary lines. In either case, this greatly reduces the number of candidate tissue boundary lines that need to be examined to verify if they do indeed correspond to an inter-tissue boundary in the ultrasound image. The candidate inter-tissue boundary lines may be examined by means of models of inter-tissue boundary lines (such as classifiers) trained to identify instances of inter-tissue boundaries within ultrasound images.

FIG. 5 compares an Average Intensity Histogram, AIH-1, with an Orientation-Aware Average Intensity Histogram, OAAIH-1, in accord with the present invention, when the boundary lines of an ultrasound image are substantially horizontal. In the present example, AIH-1 and OAAHI-1 are both constructed from the same ultrasound image 21. In the present example, the boundary lines U and L in ultrasound sound image 21 are both substantially horizontal, so AIH-1 is shown to have its intensity peaks P11 and P13 substantially coincide with the upper depth UD position of boundary line U and the lower depth LD of boundary line L. As shown OAAIH-1 also has its intensity peaks P15 and P17 coincide with depth positions UD and LD, respectively. Thus, both approaches work well when the boundary lines U and L are substantially horizontal.

FIG. 6 compares an Average Intensity Histogram, AIH-2, with an Orientation-Aware Average Intensity Histogram, OAAIH-2 when the boundary lines of an ultrasound image are not horizontal. In the present example, AIH-2 and OAAHI-2 are again both constructed from the same ultrasound image 23. In the present example, the boundary lines U and L in ultrasound sound image 23 are both slanted diagonally and curved, as is evident from horizontal upper and lower candidate lines 25 and 27, respectively. Because neither upper boundary line U or lower boundary line L are horizontal, AIH-2 is shown not to be a good indicator of where boundary lines U and L may be located. That is, neither the upper depth UD of upper boundary line U nor the lower depth LD of lower boundary line L coincide with an intensity peak of AIH-2. By contrast in OAAIH-2, peak P21 coincides with upper depth position UD and peak P23 coincides with lower depth position LD. Thus, the present OAAIH-2 is a good indicator of boundary lines depth even for non-horizontal boundary lines.

FIG. 7 provides two additional examples of an Orientation-Aware Average Intensity Histogram in accord with the present invention applied to two additional ultrasound image 31 and 33 with irregularly shaped boundary lines U and L. In both case, the intensity peaks the present OAAIH coincide with a depth position of a boundary line. For example, peaks P25 and P27 of OAAIH-3 coincide with upper depth position UD and lower depth position LD, respectively. Similarly, peaks P29 and P31 of OAAIH-4 coincide with upper depth position UD and lower depth position LD.

FIG. 8 illustrates two additional examples of Orientation-Aware Average Intensity Histogram in accord with the present invention applied to two additional histogram images 35 and 37. Again, the peaks of OAAIH-5 coincide with the upper depth position UD of boundary line U and the lower depth position LD of lower boundary line L. Similarly, the peaks of OAAIH-6 coincide with the upper depth position UD of boundary line U and the lower depth position LD of lower boundary line L.

Thus, the peaks of OAAIH indicate the candidate positions of the fat and muscle layer boundaries. This greatly reduces the search space for the fat/muscle layer boundary points from the number of image rows (order of 100's) to the number of OAAIH peaks (order of 1 or at most 10). Finally the slanted (i.e. diagonal) line of pixels in the candidate positions can then be compared to the samples or models of the fat/muscle layer boundary images to identify the fat/muscle boundaries in the testing images. For example, one may use normalized cross-correlation, and/or fitting error with the image model, and/or Rule-based such as declaring Fat to be the brightest peak with certain pre-determined depth range and/or declaring Muscle to be the deepest peak brighter than certain pre-determined threshold.

It is to be understood that the present invention, and its various embodiments, may be implemented in a data processing device and/or computing device having an input to receive the ultrasound image being examined. Thus, the present invention may be implemented using a device having one or more of a: CPU, controller, programmable data unit (such as PLD, PLA, FPLA, CPLA, etc.), volatile and non-volatile memory, data and control signal busses, input/output interfaces, displays, registers, etc.

As is explained above, the OAAIH succeeds at having at least one of its peaks substantially coincide with a depth value of an inter-tissue boundary, or object boundary, in an ultrasound image. In the example of medical diagnosis, ultrasound images (particularly for an abdominal area) typically show both fat and muscle tissue boundaries, and thus first and second OAAIH peaks would generally coincide with the depth locations of the fat and muscle boundaries, respectively.

But as is illustrated in the above discussed OAAIH examples, an OAAIH typically has more than two peaks. So the question is: out of the multiple peaks of an OAAIH, which two peaks respectively correspond to the fat boundary and to the muscle boundary? Although the answer may not be readily clear, it is noted that narrowing the search for inter-tissue type boundary lines (i.e. depths) in an ultrasound image to only depth neighborhood ranges that generally correspond to the peaks in an OAAIH (i.e. narrow the search to banded image regions of the ultrasound image) is already a great advantage over prior art methods of searching for boundary lines pixel-row by pixel-row within an ultrasound image. Thus, OAAIH greatly reduces the search space within the ultrasound image down from the total number of pixel-rows within an ultrasound image (which can be in the order of order of 100's) to the number of peaks in an OAAIH (which may be in the order of 1 or at most 10).

Methods that search for inter-tissue boundary lines within ultrasound images would therefore narrow their search to individual banded image regions of the ultrasound image (i.e. image bands) that corresponds to OAAIH peaks. One, or a combination of one or more, straightforward search methods may be used. For example, given each image band (i.e. a banded image region) corresponding to each OAAIH peak, one straightforward method may be to compute normalized cross-correlation with sample ultrasound images of known fat/muscle boundaries and find the peaks with maximum responses. Another method may involve fitting with pre-learned appearance models of fat/muscle boundaries and find the peaks with minimum fitting errors. Other methods may use observation-based rules, such as: Fat boundary lines coincide to the brightest peak within a certain pre-determined depth range; and Muscle boundary line coincides with the deepest peak brighter than a certain pre-determined threshold.

These straightforward methods are relatively simple, but pose some problematic issues that may make them less than optimal. Regarding the normalized cross-correlation method, it is noted that its reliability may be reduced due to the high noise level of ultrasound signals. It can be sensitive to misalignment, and furthermore may have a high computational cost. In regards to model fitting method, it is more efficient, but its reliability may also be affected by the high noise level of ultrasound signals. Model fitting can also be sensitive to misalignment. In regards to the rule-based approach, it is highly efficient, but rules achieved by observation can hardly work for all cases. Thus the performance of the rule-based approach can be unreliable and be incapable of generalizing to previously unseen datasets (i.e. it cannot handle new cases for which no rules have yet been defined).

A preferred method of identifying the OAAIH peaks that coincide to true tissue boundaries preferably uses a data classification approach. As it is known in the art of machine learning, classification uses a library of positive, i.e. true, samples/examples (and may also use a library of negative, i.e. false, samples) to train a machine classifier to identify rules (or characteristics) for identifying a true example and a negative example of a specific class of object within a test image. Thus, the preferred method in accord with the present invention uses classifiers, and the rules for classifying can be learned from training samples by classification methods.

Figure 9:
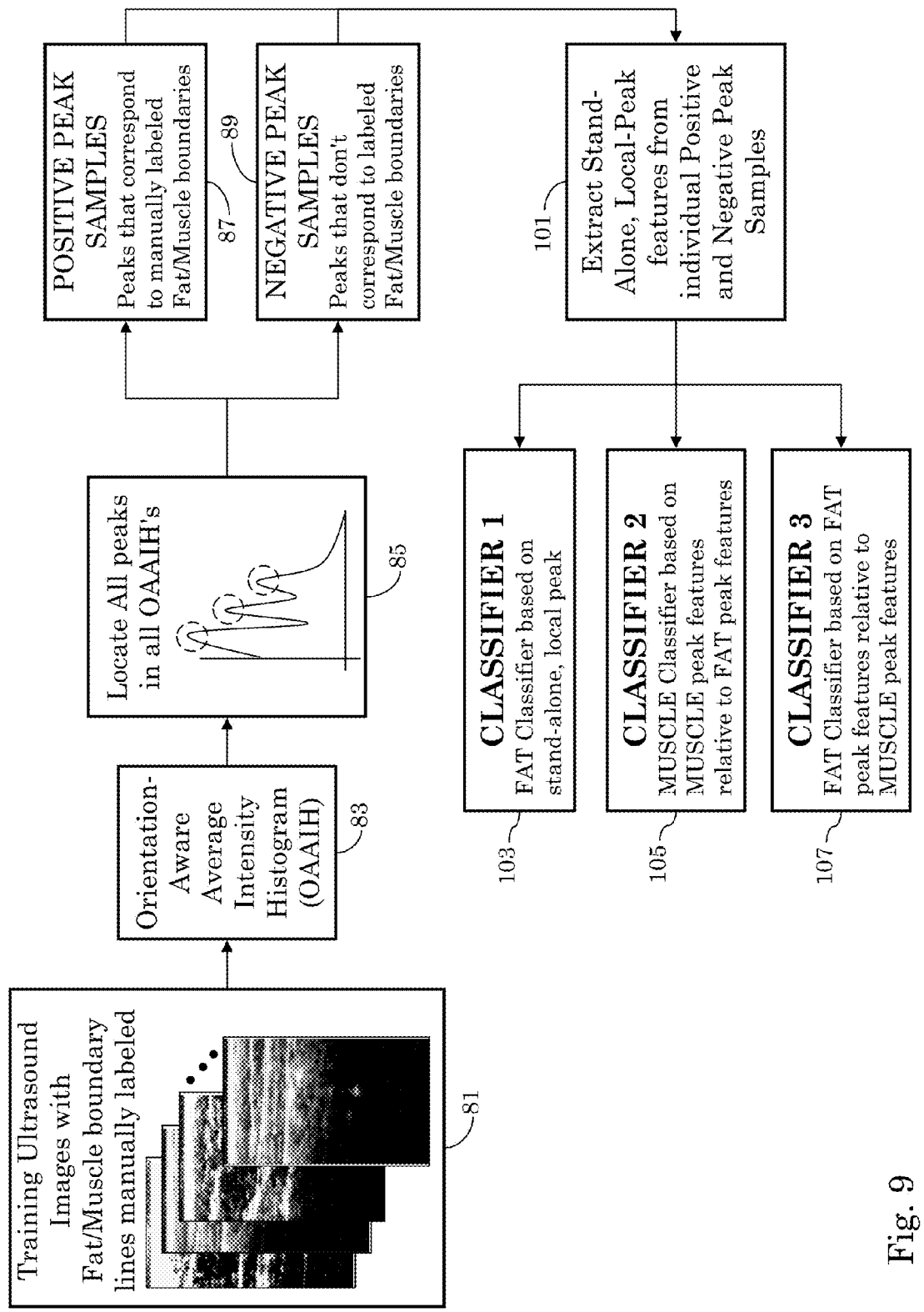
FIG. 9 illustrates some basic steps for training classifiers in accord with the present invention.

FIG. 9 illustrates some basic steps for training classifiers in accord with the present invention. First, one is provided with a training library 81 of sample ultrasound images that have labeled fat and muscle layer boundaries. These fat and muscle boundaries would have been labeled by trained ultrasound technicians, and training library 81 is used to train the classifiers of the present invention.

Each training ultrasound image in library 81 is submitted to block 83, which computes a separate OAAIH for each sample ultrasound image, as described above. Block 85 then finds all the peaks (or peak regions) within all OAAIH histograms. As block 87 illustrates, the individual peaks that correspond to labeled fat or muscle boundaries constitute positive samples. The remaining individual peaks that don't correspond to either fat or muscle boundaries constitute negative samples, as illustrated by block 89. That is, the peaks corresponding to the fat/muscle boundaries may be positive samples for the fat/muscle classifiers respectively, and the rest of the peaks may be negative samples.

When identifying the candidate lines corresponding to the positive peak samples, however, it is preferred that the tissue boundary labels provided in the sample ultrasound images of training library 81 be used as "soft labels". That is, each true label is interpreted as defining a range of positive samples (i.e. a range of positive candidate lines), as opposed to identifying only single point on the OAAIH (and thus a single candidate line) that constitutes a true tissue boundary depth.

Figure 10:
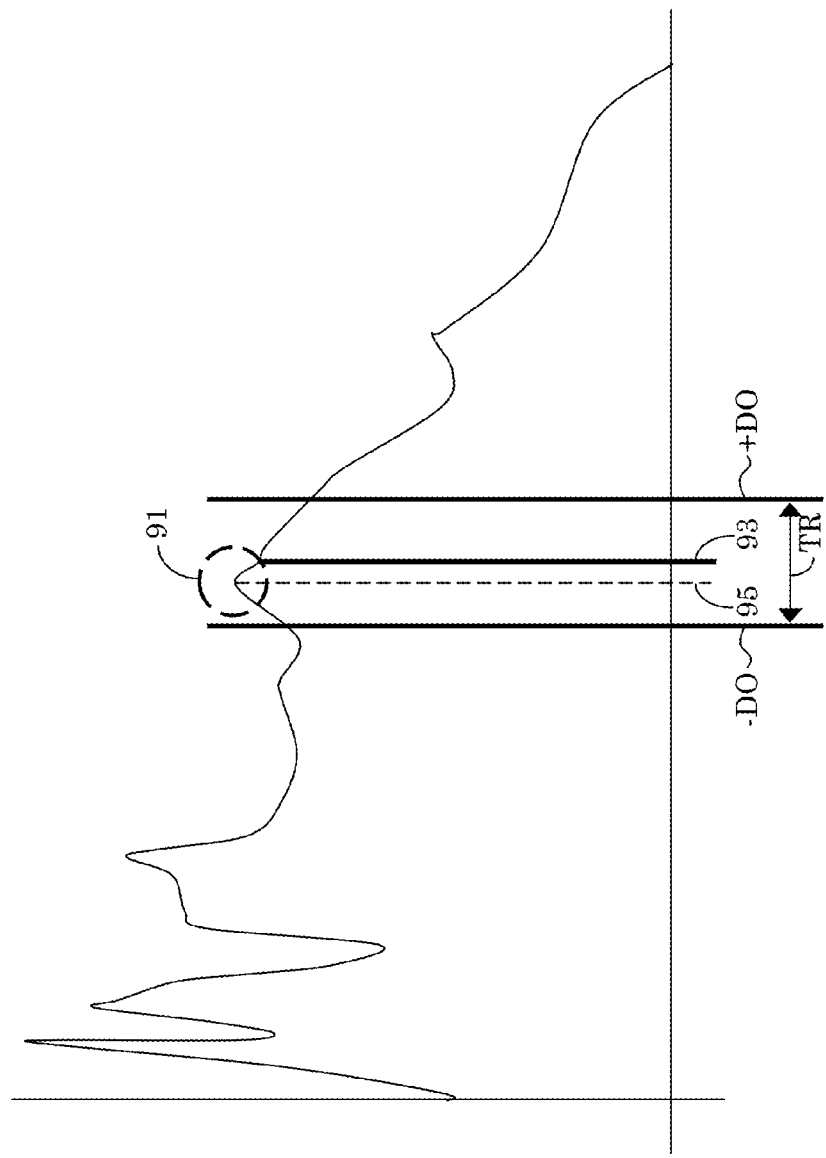
FIG. 10 illustrates the use of soft labels.

FIG. 10 illustrates the concept of soft labels. A tissue depth position 93 corresponding to a true tissue boundary label on an ultrasound image provided by a technician is shown to be close to a peak 91 of an OAAIH histogram, but does not coincide exactly with peak 91. Since the locating of tissue boundaries is subjective, the labeling of tissue boundaries from one technician to another may not be exact. That is, each technician would have physically identified the fat depth location and muscle depth location within each ultrasound image, and since these locations are based on human judgment, they might not be exact. Using soft labels, one identifies a true range TR of depths about a labeled depth point 93, and all depth locations within this true range TR are identified as true samples for training purposes. This true range may extend, for example, from +10 pixels to −10 pixels from a labeled true depth boundary 93.

In the present illustration, depth position 95 (which corresponds to a candidate line in the ultrasound image, as explained above) corresponds to peak 91, and it is shown to be within a true range TR of the labeled tissue boundary depth 93. By using soft labeling, all the depth positions (i.e. all the corresponding candidate lines) within the true range TR are determined to be true examples of the labeled tissue boundary. That is, all the candidate lines within a maximum depth offset +DO and a minimum depth offset −DO of label 93 are deemed to correspond to label 93.

A reason for using soft labeling is that the labeled fat/muscle positions in the training ultrasound image samples may not lie exactly on the OAAIH peaks, but may still be very close to the OAAIH peaks. Therefore, binary labeling (i.e. assigning a logic 1 (i.e. true) to individual labeled depth positions, and assigning a logic 0 (i.e. false) otherwise) does may not fit well (i.e. may not suit the present application well). Therefore, soft labeling is herein developed. Soft labeling is may be defined as:

$$\text{(soft) Label} = \begin{cases} \exp(-d^2/\sigma^2) & d < T \\ 0 & \text{otherwise} \end{cases}$$

where $\sigma = T/\sqrt{(-\log(L_B))}$ and d is the distance from a current depth position to the labeled fat/muscle position. T limits the range of peak positions to be not too far from the labeled position. $L_B$ is the minimum label value allowed when the OAAIH peak is at the distance of T from the labeled position.

When defining the muscle boundary classifier, OAAIH peaks that correspond to the muscle boundaries are positive samples and all the other peaks are negative samples. Similarly, when defining the fat boundary classifier, OAAIH peaks that correspond to the fat boundaries are positive samples and all the other peaks are negative samples.

Returning to FIG. 9, a next step is to extracts a number of stand-alone, local-peak features from each peak of the OAAIH histograms. This is illustrated by block 101, which receives both the positive peak samples from block 87 and the negative peak samples from block 89. Block 101 extracts a series of features that are local to each peak (or peak region). Because these local-peak features are defined independently for each peak without regard to whether it corresponds to a labeled fat or muscle boundary and without regard to its relation to other peaks that correspond to labeled fat or muscle boundaries, they are herein also termed "stand-alone" features. That is, stand-alone features lack any relational correlations between the fat and muscle tissue boundaries.

These stand-alone features are used to train the classifiers, instead of using the actual sample ultrasound images of training library 81, which makes the present process highly efficient since the stand-alone features are extracted from the OAAIH peaks and the original sample ultrasound images are not used. A presently preferred list of stand-alone, local-peak features extracted for each positive and negative OAAIH peak is as follows: (1) the weighted average intensity (OAAIH value) at the peak; (2) the OAAIH peak value divided by the maximum OAAIH value across all depth positions; (3) the OAAIH peak value divided by the sum of the OAAIH values across all depth positions; (4) the OAAIH peak value divided by the mean of the OAAIH peaks that are deeper; (5) the depth position of the OAAIH peak; (6) the distance to the second highest peak divided by the distance between the first and second highest peaks; (7) the absolute value of the feature (6); (8) the first and second order gradients at the OAAIH peak across a number of scales; (9) the gradients divided by the maximum OAAIH value; (10) the gradients divided by the sum of the OAAIH values; and (11) the detected slanting angle with maximum weighted average intensity at the peak position.

The positive and negative samples of local-peak, stand-alone features are used to construct the classifiers for fat and muscle boundaries. Many classifier types are known in the art that can be used for this purpose, such as Support Vector Machines, Adaboost, or neural networks. The presently preferred embodiment, however, uses the boosted tree classifier (also known in the art).

Preferably, three different classifiers 103, 105 and 107 are constructed. The first classifier 103 is a fat classifier, and it is trained to identify a fat tissue boundary line using only local-peak, stand-alone features as discussed above, omitting any relationship to muscle tissue boundary labels.

In addition to stand-alone features, the preferred method also uses features defined from relationships among tissue boundaries types (i.e. object boundaries), i.e. among multiple OAAIH peaks that correspond to labeled fat and muscle tissue boundaries. These features that relate fat boundaries to muscle boundaries are termed relative features. The relative features may relate to known characteristics of a muscle boundary (line) given the fat boundary (line), and vise-versa. For example, the relative features may describe the relative displacement between labeled fat and muscle boundary lines. Nonetheless, it is preferred that all the relative features be definable from the local-peak features provided by block 101.

One example of a relative feature may be the relative distance among different object boundaries since it has been found that these relative distances are quite stable across various ultrasound images. Another relative features may be the difference between the OAAIH peak values of different object boundaries, which is also quite consistent across different images. Other relative features may describe the relationships of other properties. For example, the orientations of different object boundaries can provide useful information to help distinguish peaks corresponding to object boundaries from the other OAAIH peaks.

The second classifier 105 is a muscle classifier, and it preferably includes relative features, in addition to stand-alone features. The relative features in the construction of muscle classifier 105 may include the distance to a number of the most possible fat peaks (such as those detected by a fat boundary classifier, for example first fat classifier 103); and the difference between a muscle OAAIH peak value and the most possible fat peaks and their absolute values.

The third classifier 107 is a second fat classifier, and it preferably includes relative features, in addition to stand-alone features. The relative features used in the construction of second fat classifier 107 may include: (1) the distance to a detected (or labeled) muscle boundary; (2) the distance to the detected muscle boundary divided by the distance between the first and second highest peaks; (3) the difference between the OAAIH peak value and the OAAIH value at the detected muscle position; (4) the difference between the OAAIH peak value and the OAAIH value at the detected muscle position divided by the maximum OAAIH value; (5) the difference between the OAAIH peak value and the OAAIH value at the detected muscle position divided by the sum of the OAAIH values; (6) the difference between the OAAIH peak value and the OAAIH value at the detected muscle position divided by the OAAIH value at the detected muscle position; and (7) the absolute values of feature (4) through (6) immediately above.

With the three classifiers thus constructed, they can then be used to search for fat and muscle boundaries in a test ultrasound image (i.e. a new, input ultrasound image that requires its fat and muscle boundary depth lines to be labeled). Some basic steps for searching for tissue boundary lines within a test ultrasound image are, given a new test ultrasound image, do the following: (1) compute the OAAIH histogram of the test ultrasound image and find all its OAAIH peaks; (2) at each peak, extract the same local-peak features as used in the training step (i.e. the same local-peak features as extracted by block 101); (3) pass through the extracted local-peak features for each OAAIH peak to the fat and muscle classifiers respectively; and (4) the OAAIH peak with the maximum response on fat classifier tells the position of the fat boundary and the OAAIH peak with the maximum response on the muscle classifier tells the position of the muscle boundary.

Figure 11:
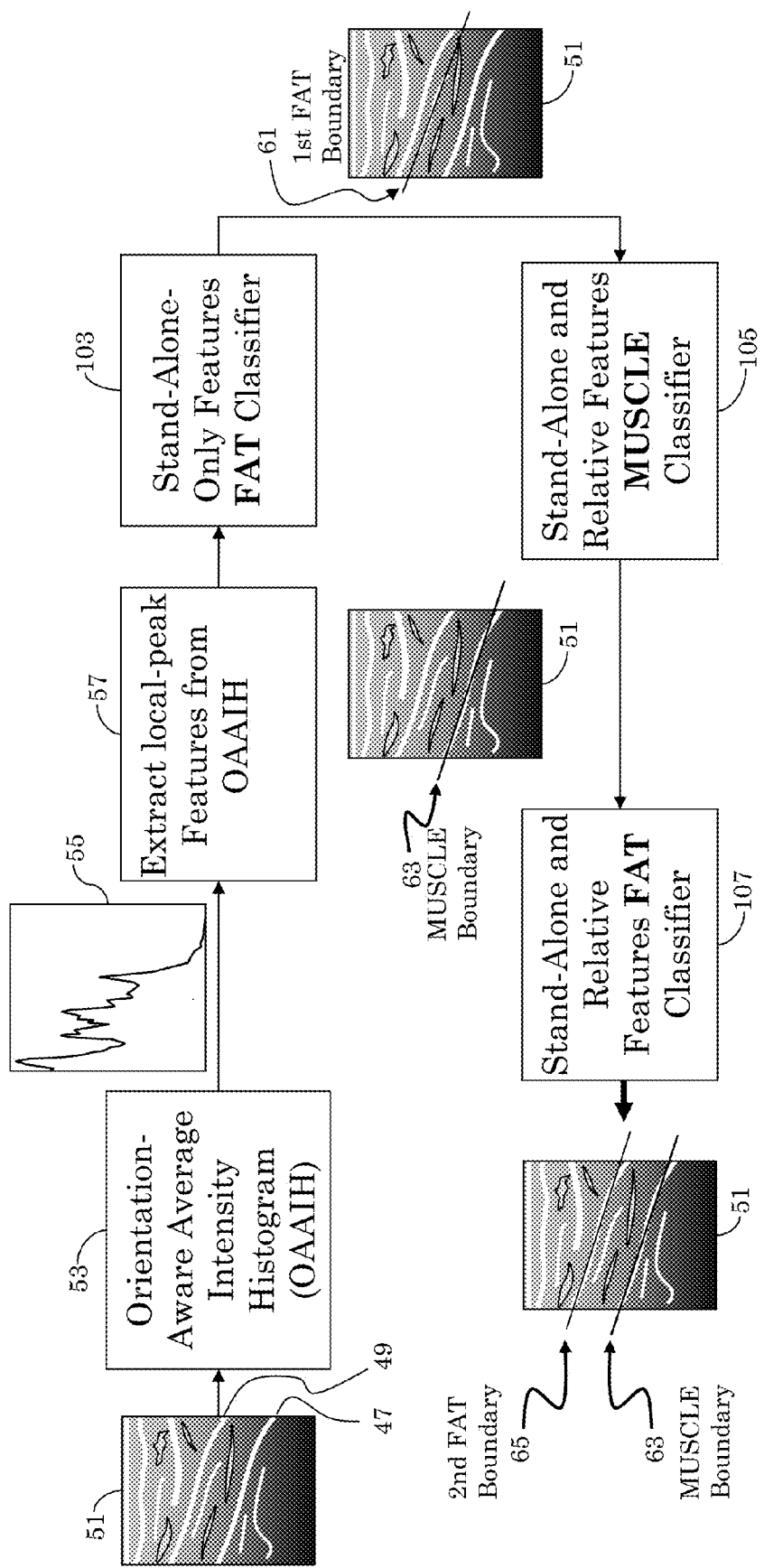
FIG. 11 provides an overview of a preferred embodiment for properly identifying the fat and muscle depth boundaries in an ultrasound image.
Figure 12:
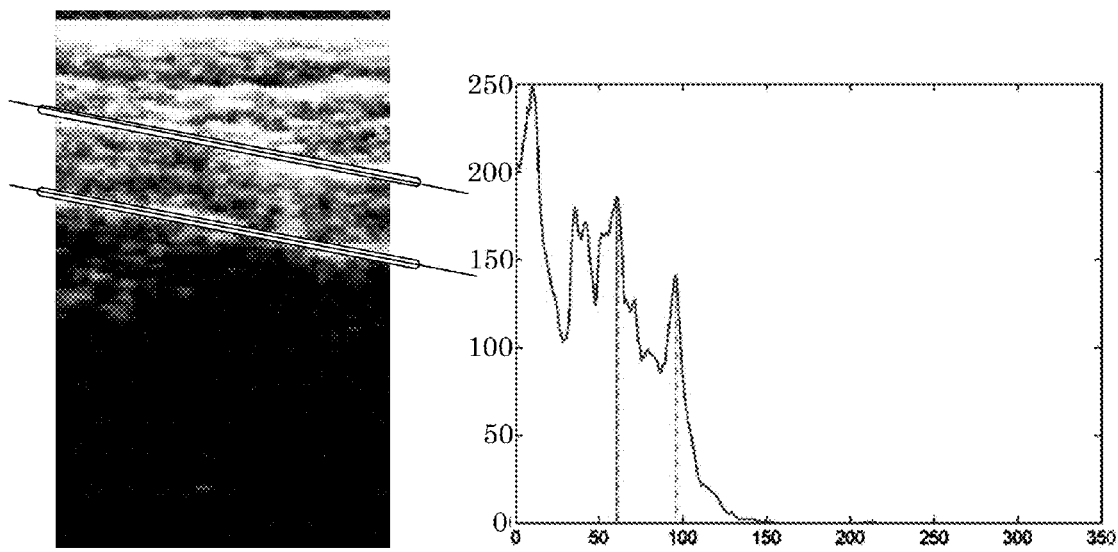
FIGS. 12-15 compare the results of the present invention versus fat boundaries and muscle boundaries manually labeled by a trained technician.
Figure 13:
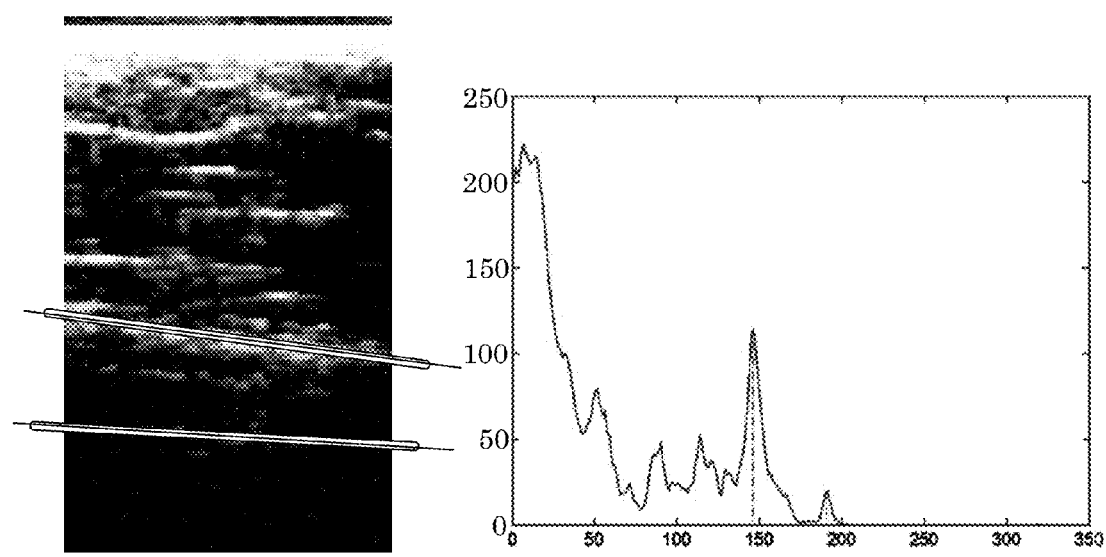
Figure 14:
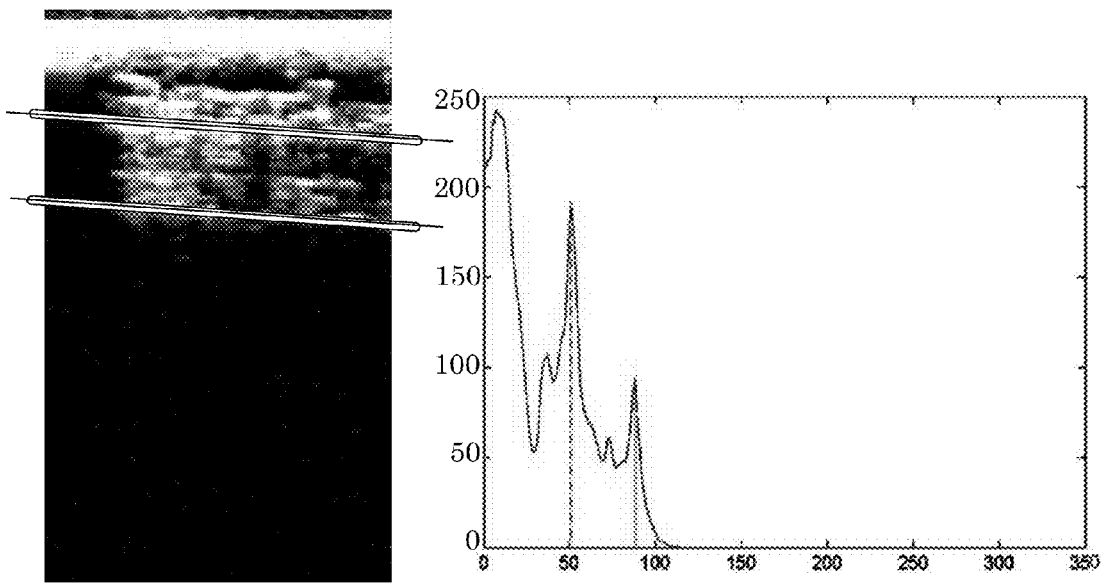
Figure 15:
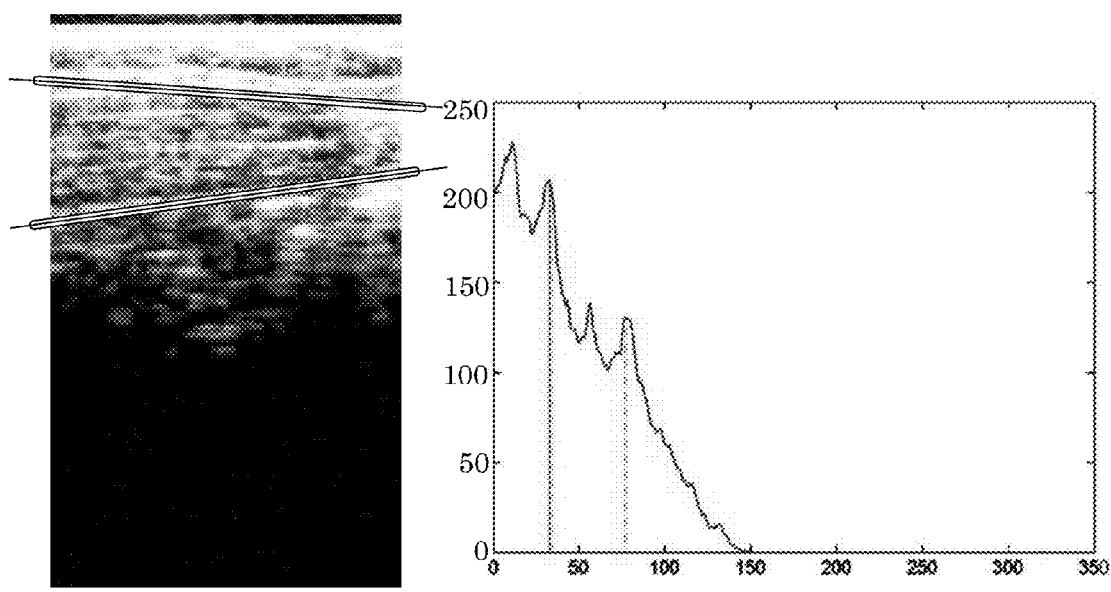

FIG. 11 illustrates an overview of a preferred embodiment for identifying the fat and muscle depth boundaries in a test ultrasound image, such as one of an abdominal area. An input, test ultrasound image 51 having an unlabeled fat tissue boundary line 49 and an unlabeled muscle boundary line 47 is submitted to an Orientation Aware Average Intensity Histogram construction block 53, as described above. This produces an OAAIH histogram 55 having multiple intensity peaks, which is submitted to a feature extraction block 57, which extracts stand-alone features as described above in reference to block 101.

First fat classifier 103, which is a stand-alone-only classifier, is trained to detect fat boundary lines using only stand-alone features, as described above. Preferably, first fat classifier 103 is trained using soft fat labels for all the positive peaks, as explained above. First fat classifier 103 identifies a likely fat boundary line, and thereby outputs a first fat boundary line 61 (shown traversing ultrasound image 51) that corresponds to the first determined fat boundary depth.

This first fat boundary depth is used as a first guess and submitted to second classifier 105, which is a muscle classifier. Muscle classifier 105 may be trained using only relative features, as described above, or by a combination of stand-alone and relative features. Construction of muscle classifier 105 preferably used both standalone features and muscle relative features, which are features that relate a muscle boundary depth to a given (i.e. specified or labeled) fat boundary depth, such as detected by first fat classifier 103. Further preferably, muscle classifier 105 was trained using soft labels for all the positive muscle (peak) samples. Because muscle classifier 105 identifies a muscle boundary relative to a given fat boundary, muscle classifier 105 uses the first fat boundary determined by first fat classifier 103 as an input to identify a muscle boundary 63. The identified muscle boundary 63 is output from muscle classifier 105, and is illustrated as a line (which may be selected from candidate lines as explained above) traversing ultrasound image 51. The output of second (muscle) classifier 105 is submitted to third classifier 107, which is a second fat classifier.

Fat classifier 107 may be trained using only relative features, as described above, but is preferably trained using a combination of stand-alone features and relative features, also as explained above. Construction of fat classifier 107 preferably used both standalone features and fat relative features, which are features that relate a fat boundary line to a given (i.e. specified or labeled) muscle depth position, such as that supplied by the muscle classifier 105. Preferably, construction of fat classifier 107 uses soft fat labels for all the positive fat (peak) samples. Because fat classifier 107 identifies a fat boundary relative to a given muscle boundary, fat classifier 107 uses the muscle boundary depth 63 determined by muscle classifier 105 as an input to identify a second fat boundary 65 that replaces the first fat boundary 61 identified by first classifier 103. The identified second fat boundary 65 is output from fat classifier 107 and combined with the muscle boundary 63 identified by muscle classifier 105, as illustrated by an upper line and a lower line, both lines traversing ultrasound image 51. As shown, these two lines coincide with the previously unlabeled true fat boundary depth 49 and the previously unlabeled true muscle depth 47 of ultrasound image 51.

Thus, a summary of the presently preferred embodiment for identifying a fat boundary line and a muscle boundary line in a test ultrasound image is:

(1) Compute the OAAIH histogram of a test ultrasound image and find all the peaks.
(2) At each peak, extract the stand-alone histogram features.
(3) Pass the stand-alone features through the stand-alone fat classifier 103 and find the peaks with top classifier responses.
(4) At each peak, extract the relative features with respect to the detected most possible fat positions (from classifier 103) and their OAAIH values.
(5) Pass the stand-alone and relative features at each peak through the muscle classifier 105 and find the muscle position of which the corresponding peak has the highest classifier response.
(6) At each peak, extract the relative features with respect to the detected muscle position (from muscle classifier 105) and its OAAIH value.
(7) Pass the stand-alone and relative features at each peak through the second fat classifier 107 and find the fat position of which the corresponding peak has the highest classifier response.

FIGS. 12-15 compare the results of the present invention for labeling fat and muscle boundary lines in test ultrasound images versus fat and muscle boundaries manually labeled by trained technicians. The lines provided by the train technicians are shown on the ultrasound images as elongated ovals, and the lines provided by the present invention are shown as thin lines traversing the ultrasound images. The corresponding depth positions are also labeled on a corresponding OAAIH histogram, but are so close to each other that both appear as a single boundary lines superimposed on each other. That is, the lines produced by the present invention are so close to those produced by a trained technician that they are shown superimposed on the lines made by the trained technician in the corresponding OAAIH histograms.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A system for identifying a first tissue boundary and a second tissue boundary in a test ultrasound image, said second tissue being of a different tissue type than said first tissue, the system comprising:
   an input for receiving said test ultrasound image;
   a data processing device configured to process said ultrasound image according to the following steps:
   (i) generate an intensity histogram from pixel intensities of said test ultrasound image, said intensity histogram having peak regions corresponding to regions of intensity peaks in said test ultrasound image,
   (ii) calculating a series of stand-alone features for each peak region of the intensity histogram, said stand-alone features being determined from local-peak characteristics of each peak region and lacking any relational correlations between the first and second tissue boundaries;
   a first classifier coupled to receive said stand-alone features, said first classifier being trained to identify said first tissue boundary using only said stand-alone features and omitting any relational information between boundaries of different tissue types, said first classifier outputting a first boundary estimate;

a second classifier coupled to receive said stand-alone features and said first boundary estimate, said second classifier being trained to identify said second tissue boundary using said stand-alone features and a first specified location of said first tissue boundary, said second classifier using said first boundary estimate as said first specified location, and outputting a second boundary estimate;

a third classifier coupled to receive said stand-alone features and said second boundary estimate, said third classifier being trained to identify said first tissue boundary using said stand-alone features and a second specified location of said second tissue boundary, said third classifier using second boundary estimate as said second specified location, and outputting a third boundary estimate;

identifying said third boundary estimate as said first tissue boundary in said test ultrasound image, and identifying said second boundary estimate as said second tissue boundary in said test ultrasound image.

2. The system of claim 1, wherein in step (i), said intensity histogram has more than two of said peaks, is characterized by having a first of said peaks substantially corresponding to said first tissue boundary, and is characterized by having a second of said peaks substantially corresponding to said second tissue depth.

3. The system of claim 1, wherein said first tissue boundary is a fat-tissue boundary and said second tissue boundary is a muscle-tissue boundary.

4. The system of claim 1, wherein said intensity histogram provides intensity information versus depth information.

5. The system of claim 1, wherein in step (ii) said series of stand-alone features include at least a plurality of local-peak features selected from the following list of features:
    weighted average intensity at the peak;
    intensity histogram peak value divided by the maximum intensity histogram value across all depth positions;
    intensity histogram peak value divided by the sum of the intensity histogram values across all depth positions;
    intensity histogram peak value divided by the mean of the intensity histogram peaks that are deeper than a current peak;
    depth position of the intensity histogram peak;
    distance to the second highest peak divided by the distance between the first and second highest peaks;
    the absolute value of the distance to the second highest peak divided by the distance between the first and second highest peaks;
    first and second order gradients at the intensity histogram peak across a number of scales;
    gradients divided by the maximum intensity histogram value;
    gradients divided by the sum of the intensity histogram values; and
    detected slanting angle with maximum weighted average intensity at the peak position.

6. The system of claim 1, wherein said second classifier uses second-tissue relative features defined from characteristics that relate intensity histogram peaks that correspond to second tissue boundaries to the intensity histogram peaks that correspond to first tissue boundaries.

7. The system of claim 6, wherein said second-tissue relative features include:

the distance to a number of the most possible intensity histogram peaks that correspond to first-tissue boundaries; and the difference between a current intensity histogram peak value and the most possible intensity histogram peaks that correspond to first-tissue boundaries.

8. The system of claim 1, wherein said third classifier uses first-tissue relative features defined from characteristics that relate intensity histogram peaks that correspond to first tissue boundaries to the intensity histogram peaks that correspond to second tissue boundaries.

9. The system of claim 8, wherein said first-tissue relative features include at least a plurality selected from the following first-tissue relative features:
    (A) distance to the second specified location of said second tissue boundary;
    (B) distance to the second specified location of said second tissue boundary divided by the distance between the first and second highest intensity histogram peaks;
    (C) difference between a current intensity histogram peak value and the intensity histogram value at the second specified location of said second tissue boundary;
    (D) difference between a current intensity histogram peak value and the intensity histogram value at the second specified location of said second tissue boundary divided by the maximum intensity histogram value;
    (E) difference between the intensity histogram peak value and the intensity histogram value at the second specified location of said second tissue boundary divided by the sum of the intensity histogram values;
    (F) difference between the intensity histogram peak value and the intensity histogram value at the second specified location of said second tissue boundary divided by the intensity histogram value at the second specified location of said second tissue boundary;
    (G) the absolute values of features (D), (E), and (F).

10. The system of claim 1, wherein in the first classifier, said first boundary estimate is a first estimate of said first tissue boundary within said test image.

11. The system of claim 1, wherein in the second classifier, said second boundary estimate is a first estimate of said second tissue boundary within said test image.

12. The system of claim 1, wherein in the third classifier, said third boundary estimate is a second estimate of said first tissue boundary within said test image.

13. The system of claim 1, wherein said test ultrasound image includes rows and columns of pixels, and in step (i) said intensity histogram is generated by the following steps:
    (a) dividing said test ultrasound image into discrete, sequential depth positions, each discrete depth position being defined by a fixed number of rows of pixels;
    (b) defining a plurality of horizontal band regions, each horizontal band region corresponding to a separate one of said discrete depth positions and fully encompassing its corresponding depth position, each horizontal band region spanning a plurality of sequential depth positions;
    (c) progressing, one discrete depth position at a time, along said input ultrasound image, and at each, current, depth position executing the following steps:
        (I) defining a plurality of potential boundary lines within the current horizontal band region that corresponds to the current depth position, each of the defined potential boundary lines traversing a common point within the current horizontal band at a different angle relative to the horizontal;

(II) defining a candidate band region corresponding to each potential boundary line following the trajectory of its corresponding boundary line and encompassing its corresponding boundary line;
(III) determining an intensity value for each potential boundary line based at least in part on the intensity of pixels within its corresponding candidate boundary region;
(IV) recording the potential boundary line of highest intensity value as the candidate line for the current depth position; and
(d) collecting the intensity values of candidate lines recorded at the different depth positions into an intensity-vs-depth histogram, said intensity-vs-depth histogram being said intensity histogram.

14. The system of claim 13, wherein in step (II), the length of each candidate band is defined by the length of its corresponding potential boundary line to traverse from one side of the current horizontal band to its opposing side, and the width of each candidate band is multiple times the pixel-width of its corresponding potential boundary line, and each potential boundary line bisects its corresponding candidate band region into two equal parts.

15. The system of claim 14, wherein in step (III), the intensity value for each potential boundary line is determined by the mean and variance of the pixel intensities within its corresponding candidate band.

16. The system of claim 15, wherein in step (III), when calculating the mean intensity of the pixel intensities within its corresponding candidate band, the intensity of each pixel is weighted by its distance to the candidate band's corresponding potential boundary line, where the farther the distance of a pixel to the potential boundary line, the smaller its weight.

17. The system of claim 16, wherein the weighted mean intensity is again weighted by the cosine of angle $\theta$ of the candidate band relative to the horizontal direction of the horizontal band.

* * * * *